United States Patent Office 3,266,076
Patented August 16, 1966

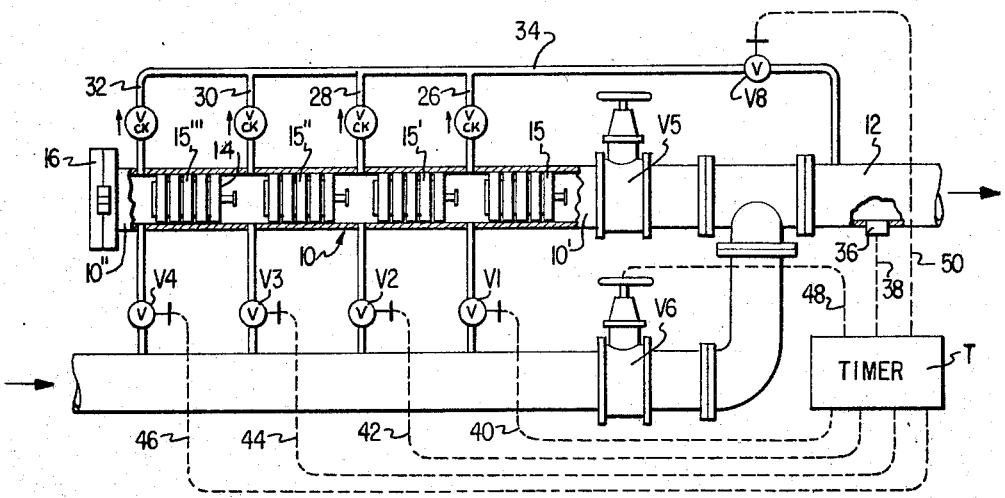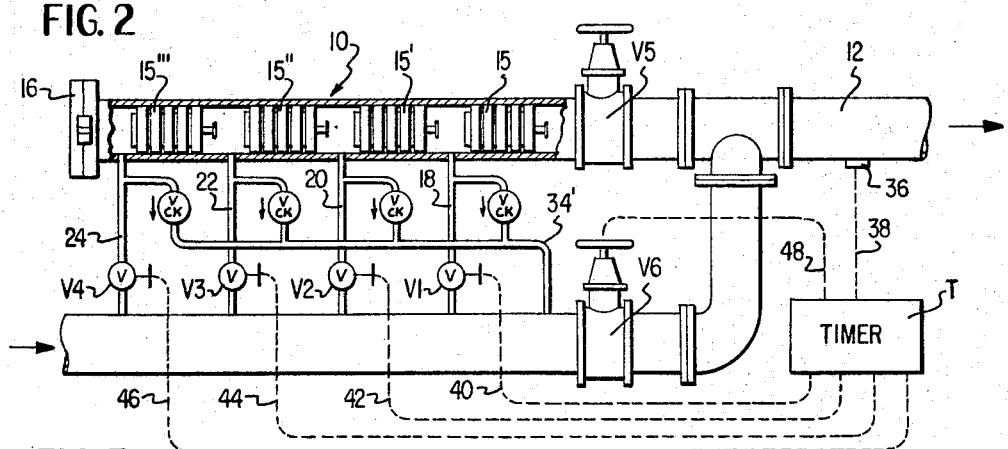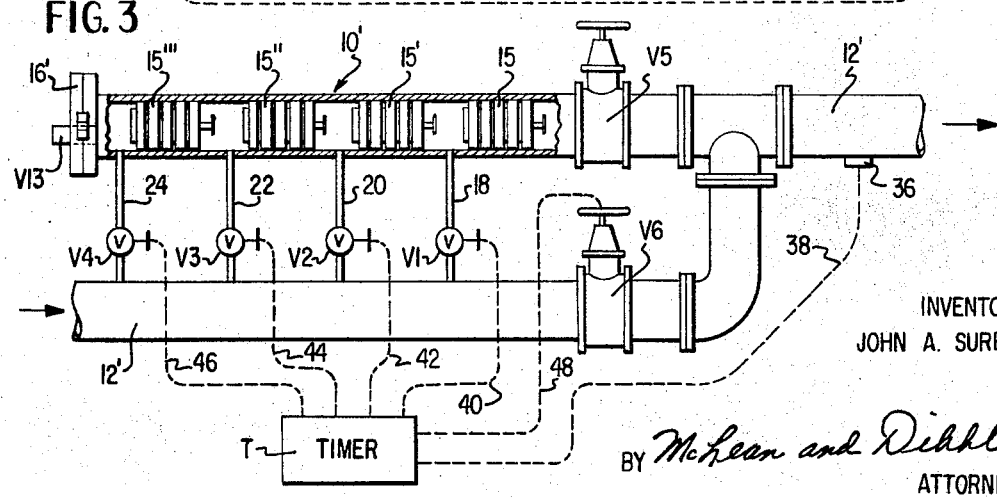

3,266,076
SYSTEM FOR CLEANING PIPELINES
John A. Surber, Tulsa, Okla., assignor to Sinclair Research, Inc., New York, N.Y., a corporation of Delaware
Filed Nov. 20, 1964, Ser. No. 412,722
15 Claims. (Cl. 15—104.06)

This invention relates to an apparatus which will permit efficient removal of hydrocarbon liquids, water, or other condensed liquids from low and high pressure gas pipelines and/or sediment in fluid, i.e., liquid as well as gas pipelines, and more particularly, to a launcher for "pigs" which pass through such high pressure fluid pipe lines to remove condensed liquids and/or sediment.

High pressure pipelines transporting fluid material are, for example, frequently required to carry a liquid phase simultaneously with a gaseous phase. Such liquids may be present in the gas when it is injected into the pipeline as in full well stream transport, or liquids such as drip gasoline or crude oil may be injected into a flowing gas stream to be transported with the gas. A problem is presented in such liquid transportation methods, however, since as the gas cools in the pipeline, liquid hydrocarbons, liquid water, etc., tend to coalesce or drop out of the gas, i.e., by condensation, and when such pipelines traverse rough terrain, this condensed or coalesced liquid tends to accumulate in low areas or in areas of lesser velocity. Also, scale, rust, sediment, etc., present a similar accumlation problem in liquid as well as gas pipelines. Such accumulations cause high pressure differentials through the pipeline and require excessive horsepower for transmission.

It is possible to minimize accumulation in pipelines and reduce the horsepower by installing drips or drain means at the points of accumulation for removing accumulated liquid and/or sediment. Accumulated liquids and sediment may be discarded or if saleable, transported in trucks to market or to the downstream end of the pipeline. Collection and removal of such accumulated liquids and sediment is not, however, a satisfactory solution to this problem since the procedure requires manpower, is wasteful and sometimes hazaradous, and may cause stream pollution. Accordingly, it has been attempted in gas pipelines, to run "pigs" i.e., solid bodies, through the pipeline to push the condensed liquid ahead of them on such a time schedule that excessive liquid will not accumulate or according to the needs of the pipeline as indicated by pressure drop. Receivers at the downstream end of the pipelines collect the "pigs" and liquid.

Conventional pigs for use in pipelines are cylindrical in shape with a series of rubber or neoprene cups spaced along the longitudinal axis. Fluid pressure behind the pig expands the cups to provide wiping contact with the inside of the pipeline and force the pig with accumulated liquids through the line.

In pipelines carrying predominately gas, the amount of liquid removed from the pipeline by each pig will depend upon the frequency with which individual pigs are sent through the line. While a certain pressure drop is required to force a pig through the pipeline, this is small compared to the pressure drop which occurs when liquid is allowed to accumulate. Frequent launching of pigs will result in each pig carrying to the end of the pipeline only a small amount of liquid and will require therefore only a small amount of storage capacity to contain liquid slugs. Slippage of fluids pass cylindrical pigs is minor and cylindrical pigs are preferred over spheres since, when velocities are low, spheres often become lodged in the pipeline at a point of constriction in one dimension while gas will continue to flow beyond the sphere. Also, brushes and other utility devices adapt more readily to cylindrical pigs than to spheres, and the pigs can be used in pipelines carrying liquids such as water, oil, etc., to remove scale, rust, sediment, etc., from the pipelines. One problem presented, particularly with cylindrical pigs, however, is that they are difficult to introduce into a pipeline. Many attempts have been made to produce an automatic launcher for introducing cylindrical pigs into pipelines but such attempts have not been successful.

The present invention has as its object the provision of an automatic launcher for cylindrical, as well as spherical, pigs. The apparatus of the present invention is adaptable to liquid as well as gas pipelines and can easily be arranged so that individual pigs are released by manual, electrical, or pneumatic operation or by radio signal from a remote location.

The automatic pig launcher of the present invention generally includes a launching barrel having essentially the same diameter as the pipeline, i.e. adapted to contain several pigs, which is connected at one end to the pipeline in such a way as to allow smooth flow or passage of the pigs into the pipeline. For example, the launching barrel can be arranged co-axial with the pipeline in a bend in the pipeline, etc., so long as the radius of curvature of the connection is sufficiently large so that the cylindrical pigs can pass smoothly, without binding into the pipeline. Conduits connected to the pipeline upstream of the launcher form a manifold for introducing the pigs into the pipeline. Each conduit is connected to the launcher barrel behind a respective pig and permits the introduction of high pressure fluid from upstream of the connection in the pipeline into the barrel, upstream, i.e., to the rear, of the respective pig. A valve arranged in each maniforld conduit provides means for selectively applying high pressure fluid behind each individual pig to introduce the pig into the pipeline.

For a more detailed description of the present invention, reference may be had to the accompanying drawings which illustrate several embodiments of the invention and wherein:

FIGURE 1 schematically illustrates a preferred embodiment of the invention;

FIGURE 2 schematically illustrates another embodiment of the invention; and

FIGURE 3 schematically illustrates a third embodiment of the invention.

Referring now to FIGURE 1, the launching barrel comprises a section of pipe 10 having essentially the same diameter as pipeline 12 which is long enough to contain several pigs, for example, four cylindrical pigs 15, 15', 15" and 15'''. Of course, the number of pigs may be varied as desired. Each pig includes a plurality of cups 14 formed of a resilient material spaced along the longitudinal axis thereof. One end 10' of the launcher pipe 10 is connected through a block valve V5 to the pipeline 12. The other end 10" of the launched pipe 10 has a full diameter closure 16, i.e., a hinged plate, which will open to allow the insertion of the pigs. Valve V5 will be closed during insertion of the pigs to seal off launcher pipe 10 from the main pipeline 12. The launcher pipe 10 has a number of launcher conduits 18, 20, 22 and 24 connected thereto. Conduits 18, 20, 22 and 24 are also connected to the main pipeline 12 and permit the introduction of high pressure gas upstream of pigs 15, 15', 15" and 15''', respectively, in the launcher pipe 10. Gas introduced into a respective one of these launcher conduits will cause the launching of the respective pig immediately downstream. Launcher conduits 18, 20, 22 and 24 are equipped, respectively with launcher valves V1, V2, V3 and V4, e.g., motor operated valves, which will be opened at the proper time as described below to apply high pressure behind the respective pig. When fluid pressure is applied behind the pig, the pig is forced into pipeline 12 and cups 14 expand to provide wiping contact with the inside of the pipeline 12. The launching pipe 10 also has a series of equalizing conduits 26, 28, 30 and 32 connected thereto which are connected via equalizing manifold conduit 34 to the main pipeline 12 downstream of the launcher to permit equalizing of the gas pressure upstream of each pig, 15, 15', 15", and 15''', with the pressure existing downstream of the launcher.

A differential pressure V6 is located in the main gas pipeline 12 upstream of the launcher but downstream of the launcher conduits 18, 20, 22, and 24. Valve V6 will be closed at the same time that a launcher valve V1, V2, V3 or V4 is opened, causing gas pressure from the main pipeline 12 to be applied in the launcher pipe 10 upstream of the individual pig 15, 15', 15", and 15''' to be launched. The differential pressure valve V6 will be opened and the individual launcher valves closed after each pig is launched.

The differential pressure valve V6 need not close completely but need open only sufficiently to provide sufficient pressure differential in the launcher pipe 10 to launch the pig. An equalizing valve V8 in the equalizing manifold conduit 34 opens and closes in unison with the differential pressure valve V6 and allows gas which has flowed upstream of any pig in the launcher pipe 10 to bleed off from the launcher pipe 10 into the pipeline 12 so that such higher pressure gas will not be responsible for launching a pig ahead of schedule. Check valves CK allow gas to escape from the launching pipe 10 to valve V8, but restrict its passage in the reverse direction.

Timer system T selects, for example, the hours of the day or the days of the week that each pig is to be launched. Such timers may be mechanically or electrically driven and are conventional so that further description is unnecessary. Time T supplies energy to motor operated valves V1, V2, V3, V4, V5, V6 and V8 (such as control air) through lines 40, 42, 44, 46, 48 and 50 to simultaneously close the differential pressure valve V6 and equalizing valve V8 and open one of the launching valves V1, V2, V3, or V4 and launch a respective pig. A mechanical device 36 i.e., a switch of conventional construction is provided in the main pipeline 12 downstream of the launcher pipe 10 to detect the passage of a pig and through line 38 control i.e., reverse the action of timer T to open valves V6 and V8 while simultaneously closing the open launching valve V1, V2, V3, or V4. This procedure minimizes pressure drop during the launching operation. During the next cycle of the timer the above sequence is repeated except that the respective valve is selected which will activate the next pig in the barrel. Preferably, the control system is designed so that with instrument, i.e., timer, etc., failure, the launching valves remain closed and the differential pressure and equalizing valves open.

Referring now to FIGURE 2, which illustrates a modification of the invention, like reference numerals will be used to designate like elements. Since valves V8 and V6 operate simultaneously and have a common downstream connection, in actual practice only one of the valves is necessary so that equivalent results can be obtained by omitting valve V8 and connecting equalizing manifold conduit 34' into the main gas pipeline 12 upstream of valve V6.

When adapting the system of the present invention to liquid pipelines, since a liquid is much less compressible than a gas, no pressure equalizing system is required. FIGURE 3 illustrates a system adapted for use with a liquid pipeline 12. The loading end of the launcher pipe 10 is equipped with a bleeder valve V13 in closure 16' to permit venting of trapped air after pigs 15, etc., are loaded into the launcher pipe 10'.

What is claimed is:

1. In combination with a pipeline adapted to contain a fluid flowing under pressure and at least one pig for passage through said pipeline, apparatus for injecting said pig into said pipeline comprising pipe means adapted to contain said pig connected at one end to said pipeline and having a diameter essentially the same as the diameter of said pipeline, the connection between said pipeline and said pipe means having a radius of curvature sufficiently large to allow said pig to pass smoothly without binding from said pipe means into said pipeline, launching conduit means connecting said pipeline upstream of said connection with said pipe means behind said pig, launching valve means in said launching conduit means, differential pressure valve means in said pipeline upstream of said connection and downstream of said launching conduit means, and means for selectively and automatically controlling operation of said pressure differential valve means and said launching valve means so that said launching valve means opens as said differential pressure valve means closes, whereby upon closure of said differential pressure valve pressure fluid is passed through said launching conduit means behind said pig to force said pig into said pipeline.

2. In combination with a pipeline adapted to contain a fluid flowing under pressure and at least one pig for passage through said pipeline, apparatus for injecting said pig into said pipeline comprising pipe means adapted to contain said pig connected at one end to said pipeline and having a diameter essentially the same as the diameter of said pipeline, the connection between said pipeline and said pipe means having a radius of curvature sufficiently large to allow said pig to pass smoothly without binding from said pipe means into said pipeline, launching conduit means connecting said pipeline upstream of said connection with said pipe means behind said pig, launching valve means in said launching conduit means, differential pressure valve means in said pipeline upstream of said connection and downstream of said launching conduit means, means for selectively controlling operation of said pressure differential valve means and said launching valve means so that said launching valve means opens as said differential pressure valve means closes, whereby upon closure of said differential pressure valve pressure fluid is passed through said launching conduit means behind said pig to force said pig into said pipeline, and signal means for actuating said means for selectively controlling said valve means to open said differential pressure valve means including means in said pipeline downstream of said connection for detecting the passage therethrough of said pig.

3. In combination with a pipeline adapted to contain a fluid flowing under pressure and at least one pig for passage through said pipeline, apparatus for injecting said pig into said pipeline comprising pipe means adapted to contain said pig connected at one end to said pipeline and having a diameter essentially the same as the diameter of said pipeline, the connection between said pipeline and said pipe means having a radius of curvature sufficiently large to allow said pig to pass smoothly without binding from said pipe means into said pipeline, launching conduit means connecting said pipeline upstream of said connection with said pipe means behind said pig, launching valve means in said launching conduit means, differential pressure valve means in said pipeline upstream of said connection and downstream of said launching conduit means, means for selectively controlling operation of said pressure differential valve means and said launching valve means so that said launching valve means opens as said differential pressure valve means closes, whereby upon closure of said differential pressure valve pressure fluid is passed through said launching conduit means behind said pig to force said pig into said pipeline, said pipe means containing a plurality of pigs and having a separate launching conduit means and launching valve means for each said pig and, said means for selectively controlling said valve means opening said launching valve means in sequence in the upstream direction from said connection.

4. Apparatus as defined in claim 3 wherein said means for selectively controlling said valve means is a timer means for opening said launching valve means at predetermined time intervals.

5. Apparatus as defined in claim 3 further including equalizing conduit means operatively interconnecting said pipe means upstream of said pig to said pipeline downstream of said launching conduit means and equalizing valve means in said equalizing conduit means, said means for selectively opening and closing said valve means controlling said equalizing valve means to open and close in unison with said differential pressure valve means.

6. Apparatus as defined in claim 5 including check valve means in said equalizing conduit means preventing flow in the direction from said pipeline to said pipe means.

7. Apparatus as defined in claim 3 including equalizing means operatively interconnecting said pipe means behind each pig to said pipeline downstream of said launching conduit means and check valve means in said equalizing means preventing flow in the direction from said pipeline to said pipe means.

8. Apparatus as defined in claim 7 wherein said equalizing means includes a manifold conduit, a separate conduit interconnecting said manifold conduit to said pipe means behind each respective pig and individual check valve means arranged in each said separate conduits.

9. Apparatus as defined in claim 8 wherein each said separate conduit is connected to a respective launching conduit means and said manifold conduit is connected to said pipeline downstream of said launching conduit means and upstream of said differential pressure valve means.

10. Apparatus as defined in claim 9 including signal means for actuating said means for selectively controlling said valve means to open said differential pressure valve means including means in said pipeline downstream of said connection for detecting the passage thereby of a pig.

11. Apparatus as defined in claim 10 wherein said means for selectively controlling said valve means is a timer means for opening said launching valve means at predetermined time intervals.

12. Apparatus as defined in claim 8 wherein said manifold conduit is connected to said pipeline downstream of said connection and said equalizing means includes equalizing valve means in said manifold conduit, said means for selectively opening and closing said valve means controlling said equalizing valve means to open and close in unison with said differential pressure valve means.

13. Apparatus as defined in claim 12 including signal means for actuating said means for selectively controlling said valve means to open said differential pressure valve means including means in said pipeline downstream of said connection for detecting the passage thereby of a pig.

14. Apparatus as defined in claim 13 wherein said means for selectively controlling said valve means is a timer means for opening said launching valve means at predetermined time intervals.

15. In combination with a pipeline adapted to contain a fluid flowing under pressure and at least one pig for passage through said pipeline, apparatus for injecting said pig into said pipeline comprising pipe means adapted to contain said pig connected at one end to said pipeline and having a diameter essentially the same as the diameter of said pipeline, the connection between said pipeline and said pipe means having a radius of curvature sufficiently large to allow said pig to pass smoothly without binding from said pipe means into said pipeline, launching conduit means connecting said pipeline upstream of said connection with said pipe means behind said pig, launching valve means in said launching conduit means, differential pressure valve means in said pipeline upstream of said connection and downstream of said launching conduit means, means for selectively controlling operation of said pressure differential valve means and said launching valve means so that said launching valve means opens as said differential pressure valve means closes, whereby upon closure of said differential pressure valve pressure fluid is passed through said launching conduit means behind said pig to force said pig into said pipeline, and equalizing means operatively interconnecting said pipe means behind each pig to said pipeline downstream of said launching conduit means and check valve means in said equalizing means preventing flow in the direction from said pipeline to said pipe means.

References Cited by the Examiner
UNITED STATES PATENTS 2,984,301   5/1961   Scott _____ 166—70
3,148,689   9/1964   Bean et al. _____ 15—104.06 X CHARLES A. WILLMUTH, *Primary Examiner.*
EDWARD L. ROBERTS, JR., *Assistant Examiner.*